Patented Oct. 28, 1952

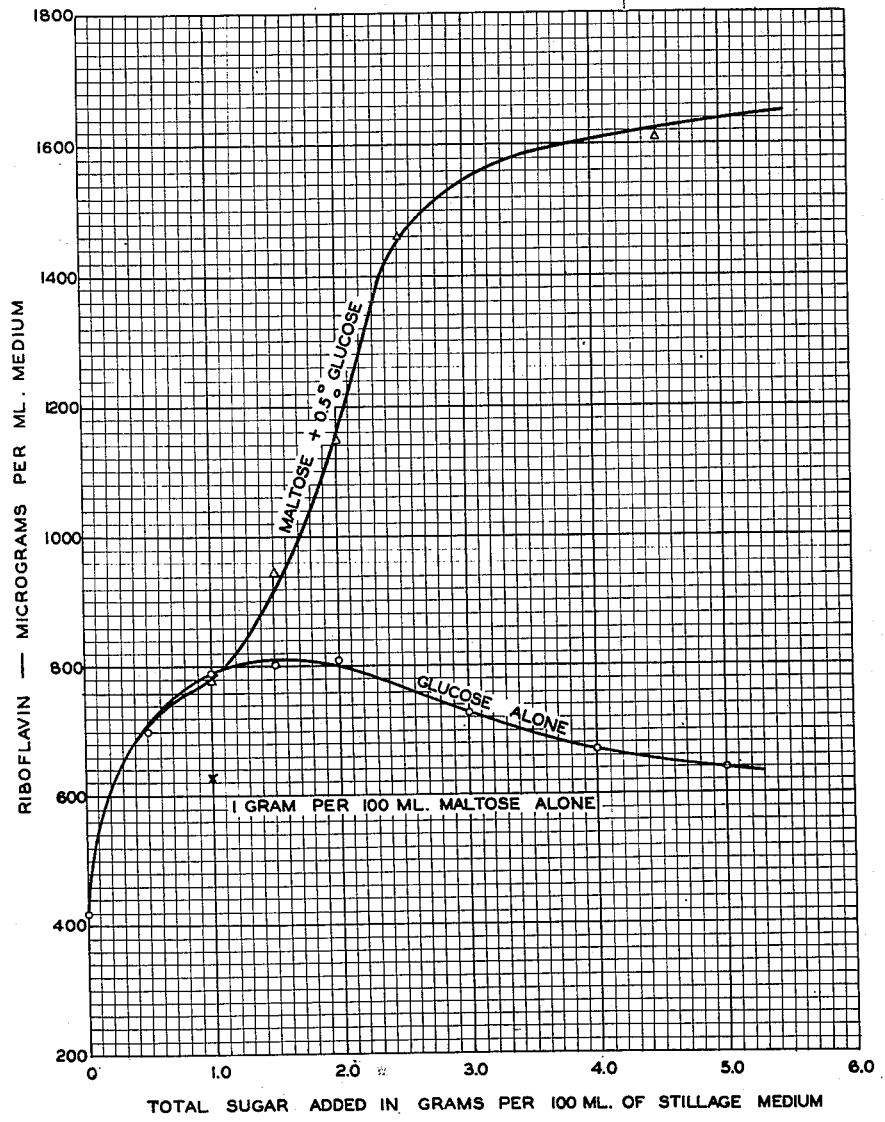

2,615,829

UNITED STATES PATENT OFFICE 2,615,829

PRODUCTION OF RIBOFLAVIN

Don H. Larsen, Terre Haute, Ind., assignor to Commercial Solvents Corporation, Terre Haute, Ind., a corporation of Maryland Application May 15, 1946, Serial No. 669,799

5 Claims. (Cl. 195—35)

This invention relates to a method for producing high yields of riboflavin by the propagation of the organism Eremothecium ashbyii on nutrient media.

It has been known that the organism Eremothecium ashbyii would synthesize riboflavin when propagated in the presence of oxygen on various solid and liquid media, including mixtures of glucose with proteins, and from waste residues from certain industrial fermentations.

In the prior-art fermentation processes, yields of riboflavin were low, usually below 500 micrograms of riboflavin per milliliter of culture liquor, under the best conditions of operation. Moreover, when maltose was substituted for glucose in the protein-glucose media mentioned above, no pronounced increase in growth or riboflavin production was obtained with cultures of the above organism.

I have now found that relatively much higher yields of riboflavin than previously obtained, and considerably in excess of the prior-art maxima of about 500 micrograms per milliliter of culture medium, can be obtained according to my invention wherein the propagation of the organism Eremothecium ashbyii is carried out in the presence of oxygen on culture media containing the requisite protein constituents derived from thin grain stillage, and in which appreciable quantities of maltose are utilized in the culture medium in combination with a small proportion of a subsidiary sugar such as glucose, sucrose, or levulose.

In carrying out my invention I utilize waste stillage residues resulting from the yeast fermentation of cereal grains in the production of ethyl alcohol. The medium to be used is adjusted so that it contains at least about 0.25% and preferably about 0.75% by weight of glucose, sucrose, and/or levulose, based on the weight of the culture medium, and at least about 0.25% and preferably about 2% of maltose on the same basis. If these minimum quantities are already inherently present in the medium used, no additional maltose, glucose, sucrose, or levulose need be added. If the medium is deficient in the specified sugars, however, additional quantities of the sugars are added to raise the concentrations to the desired levels. The maltose is added either in the form of pure maltose or as crude mixtures containing maltose, such as grain or starch mashes which have been subjected to enzyme hydrolysis to produce mixtures containing ordinarily up to about 80% maltose, on a solids basis, together with dextrines and other naturally occurring constituents of the various starchy cereal grains.

As the proportion of maltose in the medium is raised, the production of riboflavin by the organism is markedly increased, up to about 4% of maltose, at which point the increase in riboflavin production with added quantities of maltose begins to level off, as indicated in the accompanying examples.

The examples illustrate the effect on riboflavin production by the organism Eremothecium ashbyii of introducing additional quantities of glucose alone, and of maltose in the presence of small proportions of glucose into a thin grain stillage residue resulting from the yeast fermentation of cereal grains in the production of ethyl alcohol. Greater quantities of glucose, when added to such a medium, cause a rise in riboflavin production up to only about 800 micrograms per milliliter, after which the addition of still more glucose produces no substantial rise in riboflavin production, and an actual falling off with quantities in excess of about 2% based on the weight of the medium.

Sucrose, when used alone, behaves like glucose in its pattern of riboflavin production with respect to the concentration of sugar in the medium.

Most media containing maltose, but no glucose, sucrose, or levulose, produce riboflavin less rapidly than media containing glucose, sucrose, or levulose without maltose. On the other hand, when increasing amounts of maltose are added, for example, to thin grain residues such as those described above, containing about 0.5% of glucose, greatly increased yields of riboflavin result—up to over 1600 micrograms of riboflavin being produced per milliliter of culture medium when 4% maltose is added to the medium. When sucrose is the subsidiary sugar in the medium to which the maltose is added, the pattern follows a similar trend, the presence of 0.5% of sucrose and 1% maltose in the stillage medium yielding over 1000 micrograms of riboflavin per milliliter of culture liquor.

When 1% maltose is added to a medium containing 0.5% levulose, yields are similarly increased, although to not quite as great an extent as when glucose or sucrose is the subsidiary sugar.

The culture medium is prepared from thin grain stillage in the usual way, and is adjusted with respect to relative quantities of subsidiary sugar and of maltose. It is then sterilized and aseptically inoculated with an active culture of the organism *Eremothecium ashbyii*, and allowed to ferment in shallow pans, or in tanks aerated by introducing air into the medium through a sparger tube or other suitable device. Substantial quantities of riboflavin are produced in as little as five days, but maximum riboflavin yields are usually reached after about seven to ten days of fermentation under suitable conditions of temperature and aeration as known in the art.

After the fermentation has proceeded as far as desired, ordinarily until the rate of riboflavin synthesis has decreased until it is no longer profitable, the fermentation is discontinued, and the riboflavin is recovered by known processes, such as by precipitating and recrystallizing the pure riboflavin, or by drying the entire mash for use as an animal feed supplement or the like.

The following specific examples will further illustrate my invention:

EXAMPLE I

A series of nine fermentation media were prepared by dispensing 150 ml. of thin grain stillage residue, resulting from the yeast fermentation of a malted whole wheat flour mash in the production of ethyl alcohol, into one-liter flasks. In eight of the nine flasks, the thin grain stillage was supplemented by the addition of different quantities of glucose or maltose and combinations of these two sugars as indicated in the table below, in grams per 100 ml. of liquid medium. The contents of each flask, including that to which no sugar was added, were sterilized and inoculated with 1.5 ml. of a fourth-generation culture of *Eremothecium ashbyii* prepared by first transferring spores of the organism from sand to a nutrient liquid medium, and making a total of four transfers to fresh media at daily intervals. The cultures were then maintained at a temperature of 29 to 30° C. while shaking the flasks in the presence of air to supply oxygen to the organism. After fermentation for ten days under the conditions described, riboflavin yields given in the table below were obtained:

TABLE 1

*Thin grain wheat flour stillage effects of glucose and maltose*

| Sugar added, g./100 ml. | | Riboflavin, micrograms per milliliter |
|---|---|---|
| Glucose | Maltose | |
| None | None | 398 |
| 0.5 | None | 567 |
| None | 1.0 | 633 |
| 0.5 | 0.5 | 780 |
| 0.5 | 1.0 | 967 |
| 0.5 | 1.0 | 953 |
| 0.5 | 1.5 | 1,140 |
| 0.5 | 2.0 | 1,460 |
| 0.5 | 4.0 | 1,610 |

EXAMPLE II

Another series of fermentations was run on the same type of medium, and under conditions similar to those described in Example I, except that the fermentations were run for only seven days, to test the effect of other sugars on the riboflavin production of thin grain stillage, with the results given in Table 2 below. These tests show that sucrose and levulose are comparable to glucose in maltose-containing media, whereas galactose gives comparatively poor yields; and that mannose exhibits no substantial stimulating effect on thin grain stillage to which glucose has been added.

TABLE 2

*Thin grain wheat flour stillage effects of other sugars*

| Sugar added, g./100 ml. | Riboflavin, micrograms per milliliter |
|---|---|
| None | 364 |
| 0.5 glucose | 605 |
| 1.0 maltose | 635 |
| 0.5 glucose +1.0 maltose | 960 |
| 0.5 glucose +0.5 mannose | 745 |
| 0.5 sucrose +1.0 maltose | 1,022 |
| 0.5 galactose +1.0 maltose | 603 |
| 0.5 levulose +1.0 maltose | 938 |

EXAMPLE III

In order to illustrate that higher proportions of glucose alone do not give the high yields produced by small proportions of glucose plus added maltose, a series of fermentations was run for a 7-day period under conditions similar to those described in Example I, using quantities of added glucose ranging up to 5 g. per 100 ml. of medium, in direct comparison to fermentations containing glucose plus maltose, with the results given in Table 3 below.

TABLE 3

*Thin grain wheat flour stillage effectiveness of maltose*

| Sugar added, g./100 ml. | | Riboflavin, micrograms per milliliter |
|---|---|---|
| Glucose | maltose | 7 Days |
| None | None | 418 |
| 0.5 | None | 700 |
| 1.0 | None | 795 |
| 1.5 | None | 803 |
| 2.0 | None | 813 |
| 3.0 | None | 730 |
| 4.0 | None | 675 |
| 5.0 | None | 639 |
| 0.5 | 1.0 | 1,230 |
| 0.5 | 2.5 | 1,350 |

EXAMPLE IV

An extensive series of experiments was carried out substantially as described in Example I in order to demonstrate the general effectiveness of maltose in increasing riboflavin production. The results are given in the following table:

TABLE 4

*Thin grain whole wheat-wheat flour stillage*

| Fermentation Time, days | Sugar Added, g/100 ml. | | | |
|---|---|---|---|---|
| | None | 2.5 Glucose | 2.5 Maltose | 0.5 Glucose 2.0 Maltose |
| 2 | 258 | 275 | 250 | 370 |
| 3 | 443 | 577 | 458 | 637 |
| 4 | 485 | 637 | 600 | 797 |
| 5 | 475 | 753 | 732 | 910 |
| 6 | | 843 | 873 | 1,100 |
| 8 | 505 | 870 | 997 | 1,260 |
| 10 | 580 | 897 | 1,114 | 1,407 |

While the above examples describe the preferred embodiments of my invention, it will be understood that departures therefrom may be made within the scope of the specification and claims. In general it may be said that any modifications or equivalents that would ordinarily occur to those skilled in the art are to be considered as lying within the scope of my invention.

In accordance with the foregoing specification, I claim as my invention:

1. In a process for preparing riboflavin by the propagation of the organism Eremothecium ashbyii in nutrient protein-containing media, the improvement which comprises carrying out the fermentation in a medium comprising thin grain stillage resulting from the yeast fermentation of cereal grain in the production of ethyl alcohol, from 0.25 to 2.0% of a sugar selected from the group consisting of glucose, sucrose and levulose, and from about 0.25 to 5.0% of maltose said medium being free from constituents of malt extract other than maltose.

2. A process for preparing riboflavin which comprises inoculating with an active culture of the organism Eremothecium ashbyii a nutrient medium comprising a mixture of thin grain stillage resulting from the yeast fermentation of cereal grain mashes in the production of ethyl alcohol, from about 0.25 to 5.0 grams of maltose per 100 milliliters of nutrient medium, and from 0.25 to 2.0 grams per 100 milliliters of a sugar selected from the group consisting of glucose, sucrose and levulose, said medium being free from constituents of malt extract other than maltose and maintaining said inoculated medium at temperatures favorable to the growth of said organism while supplying oxygen thereto.

3. A process for preparing riboflavin which comprises inoculating with an active culture of the organism Eremothecium ashbyii a nutrient medium comprising a mixture of thin grain stillage resulting from the yeast fermentation of cereal grain mashes in the production of ethyl alcohol, from about 0.25 to 5.0 grams of maltose per 100 milliliters of nutrient medium, and from 0.25 to 2.0 grams per 100 milliliters of glucose, said medium being free from constituents of malt extract other than maltose and maintaining said inoculated medium at temperatures favorable to the growth of said organism while supplying oxygen thereto.

4. A process for preparing riboflavin which comprises inoculating with an active culture of the organism Eremothecium ashbyii a nutrient medium comprising a mixture of thin grain stillage resulting from the yeast fermentation of cereal grain mashes in the production of ethyl alcohol, from about 0.25 to 5.0 grams of maltose per 100 milliliters of nutrient medium, and from 0.25 to 2.0 grams per 100 milliliters of sucrose, said medium being free from constituents of malt extract other than maltose and maintaining said inoculated medium at temperatures favorable to the growth of said organism while supplying oxygen thereto.

5. A process for preparing riboflavin which comprises inoculating with an active culture of the organism Eremothecium ashbyii a nutrient medium comprising a mixture of thin grain stillage resulting from the yeast fermentation of cereal grain mashes in the production of ethyl alcohol, from about 0.25 to 5.0 grams of maltose per 100 milliliters of nutrient medium, and from 0.25 to 2.0 grams per 100 milliliters of levulose, said medium being free from constituents of malt extract other than maltose and maintaining said inoculated medium at temperatures favorable to the growth of said organism while supplying oxygen thereto.

DON H. LARSEN.

REFERENCES CITED

The following references are of record in the file of this patent:

UNITED STATES PATENTS

| Number | Name | Date |
|---|---|---|
| 1,532,858 | Bacon | Apr. 7, 1925 |
| 2,098,200 | Stiles | Nov. 2, 1937 |
| 2,400,710 | Piersma | May 21, 1946 |
| 2,445,128 | Tanner | July 13, 1948 |
| 2,473,817 | Phelps | June 21, 1949 |
| 2,483,855 | Stiles | Oct. 4, 1949 |

OTHER REFERENCES

Ward, Encyclopedia of Food (1923), 50 Union Square, N. Y., page 296.

Guilliermond, Comptes Rendus, T200, May 6, 1935, pages 1556–1558.